United States Patent [19]
Rose et al.

[11] Patent Number: 5,838,323
[45] Date of Patent: *Nov. 17, 1998

[54] DOCUMENT SUMMARY COMPUTER SYSTEM USER INTERFACE

[75] Inventors: Daniel E. Rose, Cupertino; Jeremy J. Bornstein, Menlo Park; Douglass R. Cutting, Oakland; John D. Hatton, Mt. Hermon, all of Calif.

[73] Assignee: Apple Computer, Inc., Cupertino, Calif.

[*] Notice: This patent issued on a continued prosecution application filed under 37 CFR 1.53(d), and is subject to the twenty year patent term provisions of 35 U.S.C. 154(a)(2).

[21] Appl. No.: 536,903

[22] Filed: Sep. 29, 1995

[51] Int. Cl.⁶ ........................................... G06F 17/00
[52] U.S. Cl. ............................. 345/349; 345/968
[58] Field of Search ................... 395/759, 603, 395/604; 707/5, 517, 531, 543, 546; 345/349, 968

[56] References Cited

U.S. PATENT DOCUMENTS

| | | | |
|---|---|---|---|
| 5,278,980 | 1/1994 | Pedersen et al. | 395/603 |
| 5,384,703 | 1/1995 | Withgott et al. | 395/759 |

OTHER PUBLICATIONS

Frakes and Baeza–Yates, "Information Retrieval, Data Structures & Algorithms", 1992, pp. 363–392.

Salvador and Zamora, "Automatic Abstracting and Indexing. II. Production of Indicative Abstracts by Application of Contextual Inference and Syntactic Coherence Criteria", Journal of American Society for Information Science, 1971, pp. 260–274.

Edmundson, "New Methods in Automatic Extracting" Journal of the Association for Computing Machinery, vol. 16, No. 2, 1969, pp. 264–285.

Edmundson, "Problems in Automatic Abstracting", Communications of the ACM, vol. 7, No. 4, 1964, pp. 259–263.

Edmundson, "Automatic Abstracting and Indexing Survey and Recommendations", Communications of the ACM, vol. 4, No. 5, 1961, pp. 226–234.

Rose, et al., "Content Awareness in a File System Interface: Implementing the 'Pile' Metaphor for Organizing Information", ACM Press SIGIR '93, pp. 260–269.

Mander, et al., "A 'Pile' Metaphor for Supporting Casual Organization of Information", CHI '92 Conference Proceedings, ACM Press—Human Factors In Computing Systems, 1992, pp. 627–634.

Kupiec, et al., "A Trainable Document Summarizer", ACM Press—Proceeding of the 18th Annual International ACM SIGIR Conference on Research and Development in Information Retrieval, 1995, pp. 68–73.

"Inside Architext", The Herring Reporter, 1995, pp. 45–47.

Salton & McGill, "The SMART and SIRE Experimental Retrieval Systems", 1983, pp. 120–123.

Salton & Buckley, "Term–Weighting Approaches in Automatic Text Retrieval", Information Processing & Management, vol. 24, No. 5, pp. 513–523.

Witten, Moffat & Bell, "Managing Gigabytes, Compressing and Indexing Documents and Images", 1994, pp. 141–148.

Gerald Salton, entitled "The Smart Retrieval System, Experiments in Automatic Document Processing, " Copyright 1971, Prentice–Hall, Inc., pp. 144–156.

Simpson, Allen, Mastering WordPerfebt 5.1 & 5.2 for Windows, Sybex Inc., pp. 436–439, 1993.

*Primary Examiner*—Edward R. Cosimano
*Assistant Examiner*—Barton L. Bainbridge
*Attorney, Agent, or Firm*—Edward W. Scott, IV

[57] ABSTRACT

A computer system user interface provides a document summary which allows the user to more easily identify the contents and subject matter of the document.

36 Claims, 8 Drawing Sheets

FIG. 7

Automatic Summary Window

| Name | Size | Kind | Label | Last Modified |
|------|------|------|-------|---------------|
| Auto Summary Patent | 40K | MacWrite Pro docu... | -- | Tue, Sep 26, 1995, 5:24 PM |
| Monday Night NFL 9/25/... | 16K | MacWrite Pro docu... | -- | Tue, Sep 26, 1995, 5:11 PM |
| Pioneer To License MacOS | 16K | MacWrite Pro docu... | -- | Tue, Sep 26, 1995, 4:59 PM |

Comments: A real-time interactive document summarization system which allows the user to continuously control the amount of detail to be included in a document summary.

*FIG. 8*

DOCUMENT SUMMARY COMPUTER SYSTEM USER INTERFACE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights.

REFERENCES TO RELATED APPLICATIONS

The present application is related to co-pending U.S. patent application having Ser. No. 08/536,020 filed on the same day as the present application, assigned to the same assignee and having the same inventive entity.

FIELD OF THE INVENTION

The present invention relates to the field of document summarization which is otherwise known as automatic abstracting wherein an extract of a document (i.e., a selection of sentences from the document) can serve as an abstract.

BACKGROUND OF THE INVENTION

The advent of the personal computer and modern telecommunications has resulted in millions of computer users communicating with each other around the globe. One of the primary uses of such computers by such users is accessing the vast store of digital information which has been created over the last several decades. Further, additional digital information is created daily due to both the conversion of information previously unavailable digitally and the large amount of new information created by an ever increasing computer user population.

One concern with this vast, ever increasing amount of digital information is the time it takes to read even a small portion of it. Whether one is reviewing a previously arranged set of documents, as in the case of reading an on-line newspaper or magazine, reviewing the results of an electronic search, or scanning documents stored on a large hard disk drive of a personal computer, it can still take considerable time to read more than a minimal amount.

What is needed, therefore, is a facility which provides a summary or abstract of each document. Having a summary of each document allows the reader to determine whether that document is of interest, and hence, reading more of the document might be desirable. Conversely, reading the summary of a document could suffice to sufficiently inform the reader about the document, or instead, could indicate to the reader that the particular document is not of interest. No matter the result, a good document abstract mechanism could be quite valuable in the modern digital world.

However, a good document abstract mechanism means more than merely providing an automatic summary of a document. Prior approaches to document summarization or "Automatic Sentence Extraction", as discussed on pages 87–89 of the "Introduction to Modern Information Retrieval" by Salton and McGill, Copyright 1983, incorporated herein by reference in its entirety, have yet to yield abstracts "in a readable natural language context" which "obey normal stylistic constraints." Salton and McGill further state that "[r]eadable extracts are obtainable without excessive difficulties, but perfection cannot be expected within the foreseeable future."

One difficulty with prior document abstract mechanisms, even when overcoming many of the natural language barriers, is that the system or mechanism can never know for certain whether the user is receiving as much or as little of an abstract as they would like. In other words, no matter how well the mechanism can determine which portions of the document to include in the summary or abstract, the mechanism can never automatically include just the right amount of abstract to always please the user. This can be due to different users' interest levels, different user's reasons for reviewing the document, and even time or situation varying interests of the same user. As such, what is needed is not necessarily a better abstracting algorithm as much as a mechanism which allows the user to interactively specify whether the present abstract is sufficient or, instead, whether more or less of the original document should be included in the abstract or summary.

The present invention utilizes an interactive control which allows the user to specify whether more or less of the original document should be included in the document summary. Allowing the user to interactively control how much of the original document gets included in the summary facilitates rapid review of documents in which the user has little interest as well as review of up to the entire document in the case of great user interest. Furthermore, such interactive control allows the user to expand and contract summarized documents at will, thus freeing the user to focus on the content of the summarized document rather than on trying to determine what amount or percentage is sufficient or how the underlying abstracting mechanism operates.

BRIEF DESCRIPTION OF THE DRAWINGS

The present invention is illustrated by way of example and not limitation in the figures of the accompanying drawings, in which like references indicate similar elements, and in which:

FIG. 7 is a sample user interface display showing the "top sentence" of a document in a comments field of an informational window of the document in a computer system user interface;

FIG. 8 is a sample user interface display showing the "top sentence" of a document in a pop-up area of a display line or listing of documents in a computer system user interface; and, FIG. 9 is a sample user interface display showing the "top sentence" of a document in an open dialog box in a computer system user interface.

SUMMARY AND OBJECTS OF THE INVENTION

It is an object of the present invention to provide an interactive document summarization system.

It is a further object of the present invention to provide an interactive document summarization system wherein the user of the system can control the amount of the document summary.

It is a still further object of the present invention to provide a file listing containing document summary information.

It is an even further object of the present invention to provide document summary information about a document in a variety of contexts.

The foregoing and other advantages are provided in a computer file system file directory listing displayed on a computer display, wherein a method of displaying a summary of a document comprising one or more sentences comprises, (i) displaying in the computer file system file directory a listing referencing the document, (ii) ranking the relevance of the one or more sentences of the document to the document as a whole, and (i) displaying in the computer file system file directory the highest ranking one or more sentences of the document.

The foregoing and other advantages are also provided by a document summary display system comprising, (i) a document containing one or more separate sentences, (ii) a relevance ranking means for ranking the relevance of the one or more separate sentences of the document, and, (iii) a display means for displaying a summary of the document within a computer system user interface listing containing a displayed reference to the document wherein the summary of the document is based upon the relevance ranking of the one or more sentences.

Other objects, features and advantages of the present invention will be apparent from the accompanying drawings and from the detailed description which follows.

DETAILED DESCRIPTION OF THE INVENTION

Figure 1:
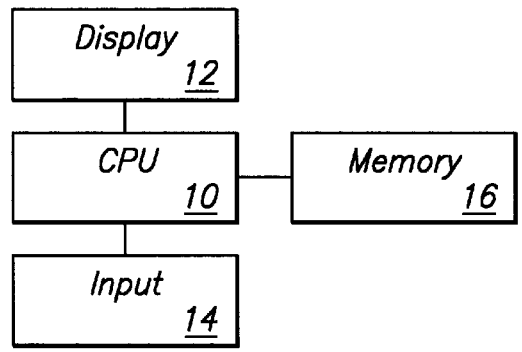
FIG. 1 is a diagram of a typical computer system as might be used with the present invention.

The present invention can be implemented on all kinds of computer systems. Regardless of the manner in which the present invention is implemented, the basic operation of a computer system embodying the present invention, including the software and electronics which allow it to be performed, can be described with reference to the block diagram of FIG. 1, wherein numeral 10 indicates a central processing unit (CPU) which controls the overall operations of the computer system, numeral 12 indicates a standard display device such as a CRT or LCD, numeral 14 indicates an input device which usually includes both a standard keyboard and a pointer-controlling device such as a mouse, and numeral 16 indicates a memory device which stores programs according to which the CPU 30 carries out various predefined tasks. The interactive document summarization program according to the present invention, for example, is generally also stored in this memory 16 to be referenced by the CPU 10.

As stated above, the process of document summarization or automatic abstracting is well known in the art. A variety of different mechanisms, used singly and in combination, have been tried to automatically create document summaries or abstracts. Such mechanisms typically start with determining the significance of particular words and/or sentences, usually by focusing on position in the document, semantic relationships, and term frequencies. Further criteria may include contextual inference and/or syntactic coherence.

However, again, regardless of the sophistication of the summarization mechanism (and note that the present invention is equally applicable to document summarization using any reasonable summarization mechanism now known or later developed), it is highly unlikely that any particular summarization mechanism will always generate the degree of detail desired by the user. As such, the present invention provides the user with a control mechanism to vary the degree of summary detail so as to suit the particular user's tastes and interests at that point in time and for that particular purpose.

In the preferred embodiment of the present invention a "summarization engine" (again, any reasonable summarization mechanism would work with the present invention) running on a personal computer is used to rank all of the sentences in a document from most to least representative. The user interacts with the system by adjusting a slider control displayed in a graphical user interface of the computer system. As the user moves the slider to a given position, the engine returns the top n sentences, where n is based on the slider's position. The sentences' original order and paragraph structure are maintained in the preferred embodiment of the present invention as a summary consisting of those n sentences is displayed in a window on the computer screen.

The effect of the present invention is that as the user moves the slider, the window instantaneously updates to display a summary with more or less detail and in the same order as the original document. Thus, as the user moves the slider to ask for more detail the summarized document appears to grow with the ever-increasing number of sentences instantly appearing in their original order and paragraph structure (with the upper limit being the entire original document). And as the user moves the slider to ask for less detail the summarized document appears to shrink with the sentences instantly disappearing and the remaining sentences within each remaining paragraph collapsing to form new summary paragraphs (with the lower limit being the one sentence most characteristic of the entire document according to the summarization mechanism). And again, the interface mechanism of the preferred embodiment of the present invention operates as simply as having the user manipulate a cursor control device such as a mouse, trackball or trackpad, to move a slider control on the computer display to indicate that more or less summary information is desired.

Figure 2:
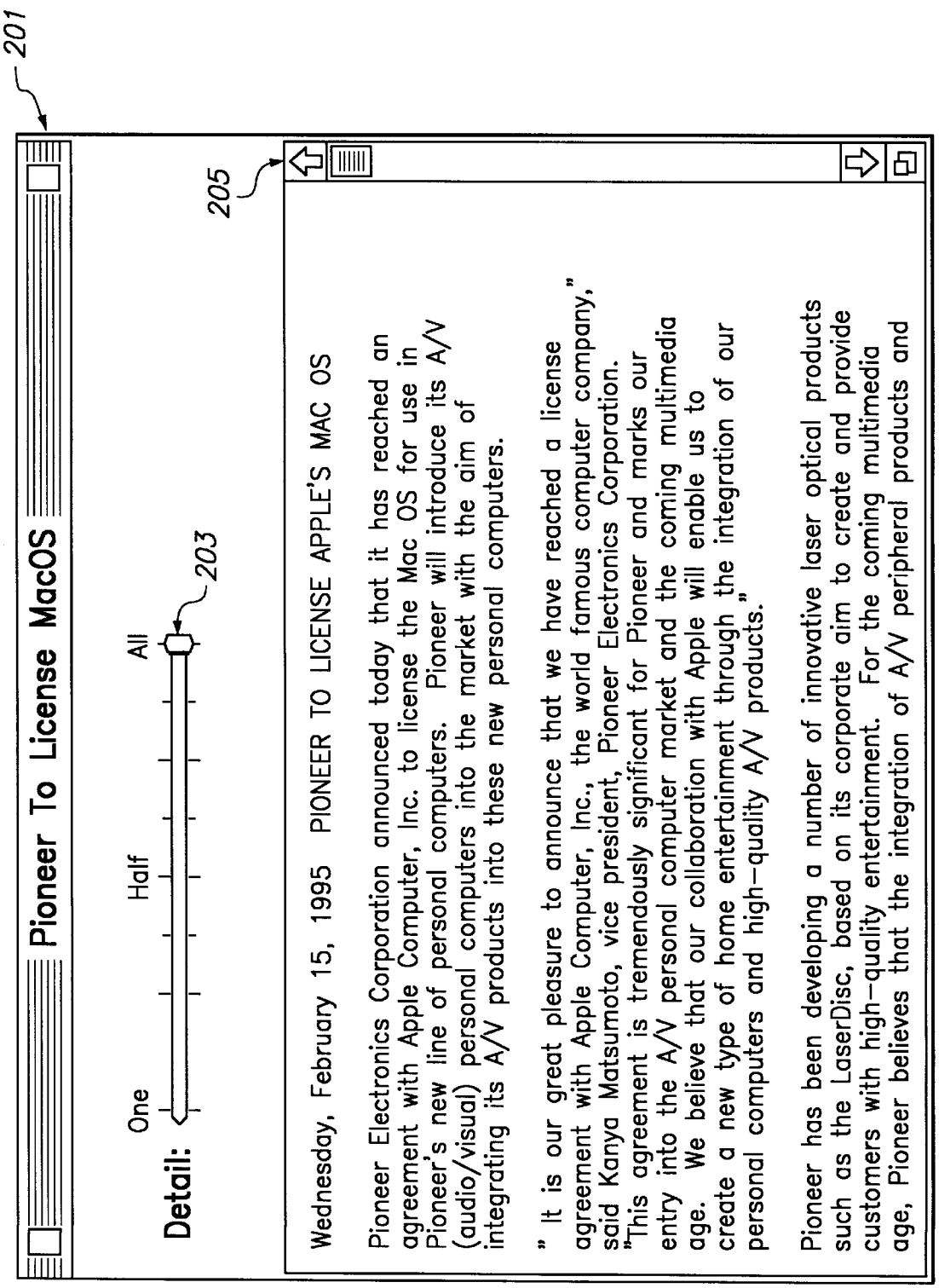
FIG. 2 is a sample summary document window according to one implementation of the present invention wherein "All" of the original document to be summarized is displayable.

Referring now to FIG. 2, a sample screen from the system before it has summarized the document can be seen. In the figure, a document summary window 201 can be seen wherein the slider 203 is set to "All," indicating that all of the sentences in the original document are to be shown. The scroll bar 205 on the right hand side of the window, a standard feature of the standard Macintosh Finder user interface environment, indicates that there is more of the document that exists than can fit within the window 201 displayed on the screen (in other words, while the "All" setting allows viewing of the entire document, not all of the document may be displayable at a given point in time due to display screen and/or window size constraints). In this example, the original document contains 32 sentences and, with this window size, would fill several screens of text.

Figure 3:
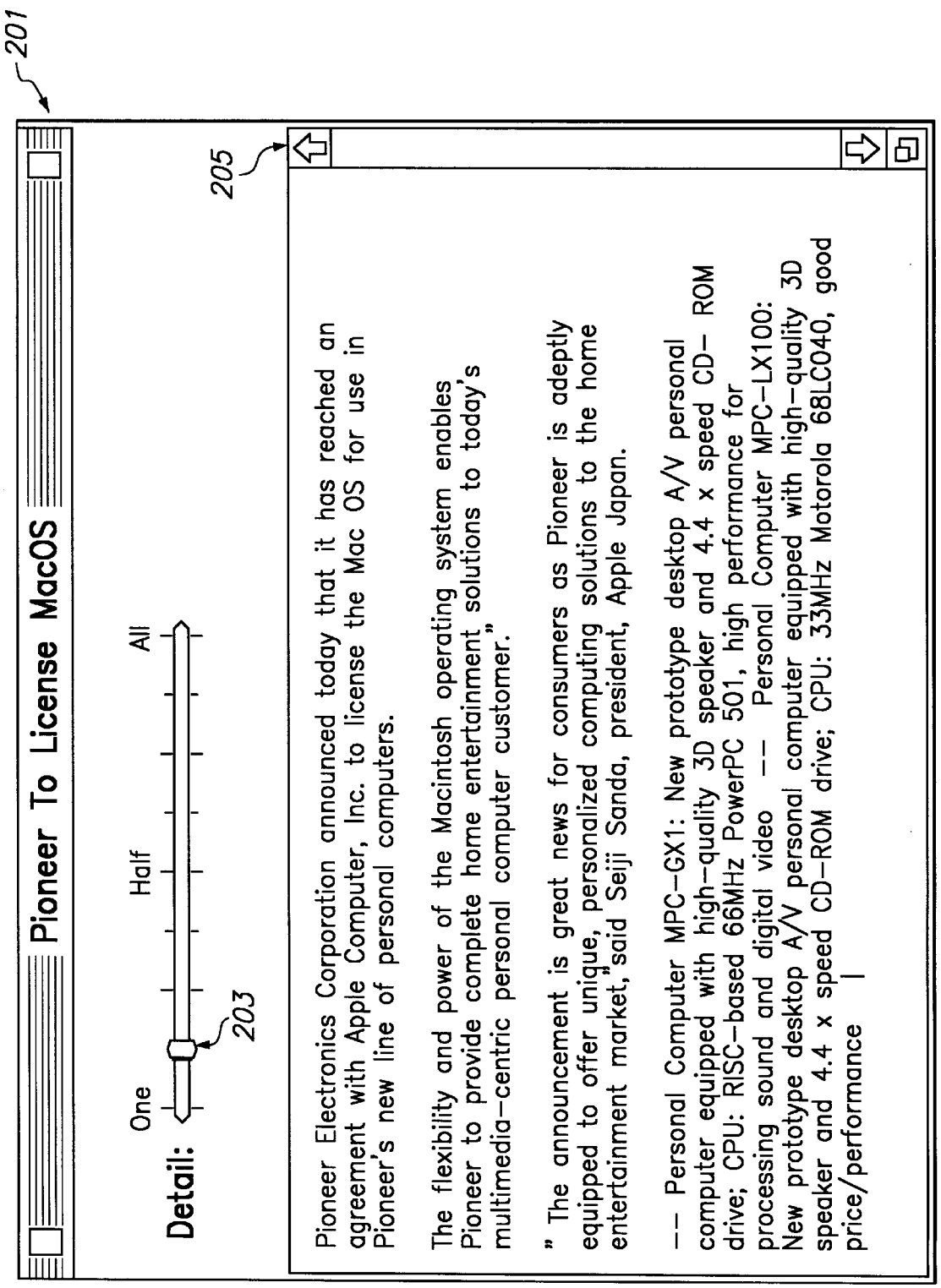
FIG. 3 is a sample summary document window according to one implementation of the present invention wherein one-eighth of the original document to be summarized is displayable.

Referring now to FIG. 3, the user has moved the slider 203, typically via a cursor control device such as a mouse, trackball, or trackpad, to indicate that he only wants a summary one-eighth the size of the original document (note that predetermined summarization settings, wherein the system automatically generates a preset amount of summarization according to previously set system or user values, are equally supportable with the present invention) to be displayed within the document summary window 201. The summary now fits within the window 201, as indicated by the empty scroll bar 205 on the right hand side of the summary window.

Figure 4:
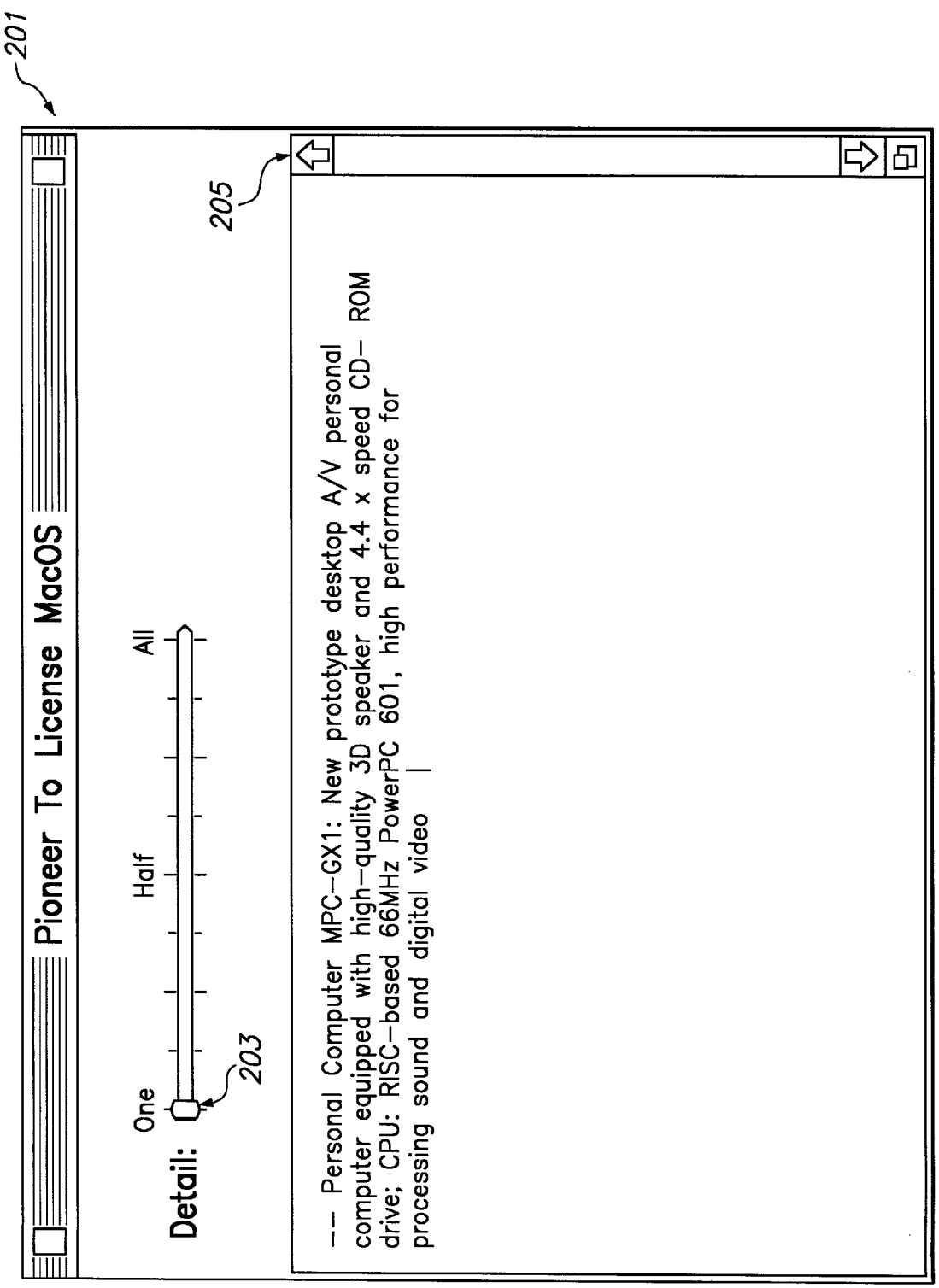
FIG. 4 is a sample summary document window according to one implementation of the present invention wherein "One" most representative sentence of the original document to be summarized is displayable.

Referring now to FIG. 4, the user has now moved the slider 203 to indicate that he only wants a summary which shows the one sentence deemed by the summarization engine to be most representative of the document's content to be displayed within the document summary window 201.

It is important to note here that the examples of FIGS. 2–4 are merely static points in time and that the user has the flexibility to continuously alter the slider position. In this way, the user might first see the summary window as it appears in FIG. 3, wherein one-eighth of the document is displayed. Then, the user might continuously move the slider towards the "All" setting thus requesting more and more of the document be displayed in the summary window until he reaches the summary window as it appears in FIG. 2, wherein all of the original document is available for viewing. Then, the user might decide that less of the document is desired to be viewed and thus move the slider back towards the "One" setting, such that the system is continuously showing less and less of the original document. Finally, the user might end up moving the slider all the way down to the "One" setting, wherein only the one most indicative sentence is displayed in the document summary window as it appears in FIG. 4.

As just explained, a significant advantage of the present invention lies in the use of the slider or knob user interface control. Just as in the case of a dimmer switch to control room lighting, which provides direct-feedback by having the light get brighter or dimmer as the user moves the slider or knob control as well as having an essentially infinite number of settings, using a slider or knob control in the present invention has greater intuitiveness and utility than would mere up and down buttons having discrete, quantized levels. A slider control combined with immediate display feedback (immediately displaying greater or fewer sentences in the document being summarized as the user moves the slider) means the user only has to be concerned about whether the amount of summarized information being displayed is of the desired quantity.

And the present invention has clear advantages over requiring the user to specify actual summary values or percentages. Just as in the case of a light dimmer switch where the user only knows that they want more or less light (rather than, say, knowing that what they want is 15% more light or 22% less light), the slider control of the present invention avoids placing on the user the additional cognitive load of first estimating the new amount desired. In other words, after the user determined that more or less summary information was desired, if the interface mechanism required specifying a summary percentage or utilizing up and down buttons then the user would have to be concerned with exactly how much or less information is truly desired. It is less intuitive to require the user desiring more information to first determine that 49% isn't enough but that 58% is sufficient or to try a series of static up and down clicks until the desired amount is obtained. The more intuitive interaction mechanism of the present invention allows the user to interactively operate a continuously variable control while providing immediate display feedback of the greater or lesser information until the user determines that the appropriate amount of information is displayed.

Thus, another advantage of the present invention, as alluded to above, is that the user has the option of continuously changing the amount of summary information being displayed which thus facilitates the user requesting more and more of the original document as the greater and greater summary amount further piques the user's interest. And then, after the user has read the desired amount of document summary, the user still has the option of decreasing the final amount of summary information. This has the added benefit of providing the reader with as much information as desired while still facilitating minimal document summaries which might then be used in other ways (e.g., see below regarding "View by Sentence" and "comment window" applications).

A general overview of the summarization engine of the present invention will now be explained. Note first, however, that any of a large variety of well-known summarization techniques are equally applicable to the present invention. In many prior art document retrieval systems a "vector model" approach has been taken where each record or document is represented by a vector representative of the distribution of terms in the document. A particular search query is then represented as a vector such that the retrieval of a particular record or document then depends upon the magnitude of a similarity computation between the particular document's representative vector and the query's representative vector. Suffice it to say that the vector model of document comparison is well known in the art of computer search and retrieval mechanisms (see Salton and McGill, Introduction to Modern Information Retrieval, 1983, pages 120–123, Salton and Buckley, "Term-Weighting Approaches in Automatic Text Retrieval" Information Processing & Management, Vol. 24, No. 5, pp. 513–523, Witten, Moffat, and Bell, Managing Gigabytes, Compressing and Indexing Documents and Images, 1994, pp. 141–148, and Frakes and Baeza-Yates, Information Retrieval, Data Structures & Algorithms, 1992, pp. 363–392, all incorporated herein by reference in their entirety).

Typical prior art search and retrieval mechanisms, however, attempt to find, out of a corpus comprised of multiple documents, one or more documents which are most similar to a single query which may itself be a document. Instead, the preferred embodiment of the present invention treats each sentence in the document to be summarized as being equivalent to an entire document, and thus the set of all of the sentences of the document can be treated as the corpus of documents to be searched. Then, the present invention treats the text of the original document as the query to be applied to the corpus. In this way, a determination can be made as to how similar each sentence in the document is to the document as a whole. The result is a ranking or value score for each sentence in the document being summarized. Then, depending upon either a preset value n or the user specified slider setting n, only those sentences above the ranking or value score of n get displayed in the document summary.

Furthermore, the present invention, as is common in the art, uses term weighting to provide distinctions between the various terms or, in the present invention, words in a document. The present invention utilizes a well known term weighting formula (see, e.g., page 518 of Salton and Buckley in the "Term-Weighting Approaches in Automatic Text Retrieval" article referred to above and incorporated herein) wherein the term-weighting components are as follows:

tf=the number of times a term (word) occurs in a sentence or in a document as a whole;

N=the number of sentences in the document; and, n=the number of sentences in the document which contain a given term.

The term-weighting formula is applied to both document and query vector terms and is tfc where t is replaced by log (tf +1) to better normalize long documents and to keep things positive, f is replaced with log(N/n)+1 to permit a search for a word that occurs in every sentence to in fact find every sentence, and c is unaltered, i.e., each weight in a vector is divided by the square root of the sum of all the squares of the unnormalized weights for the vector.

Figure 5:
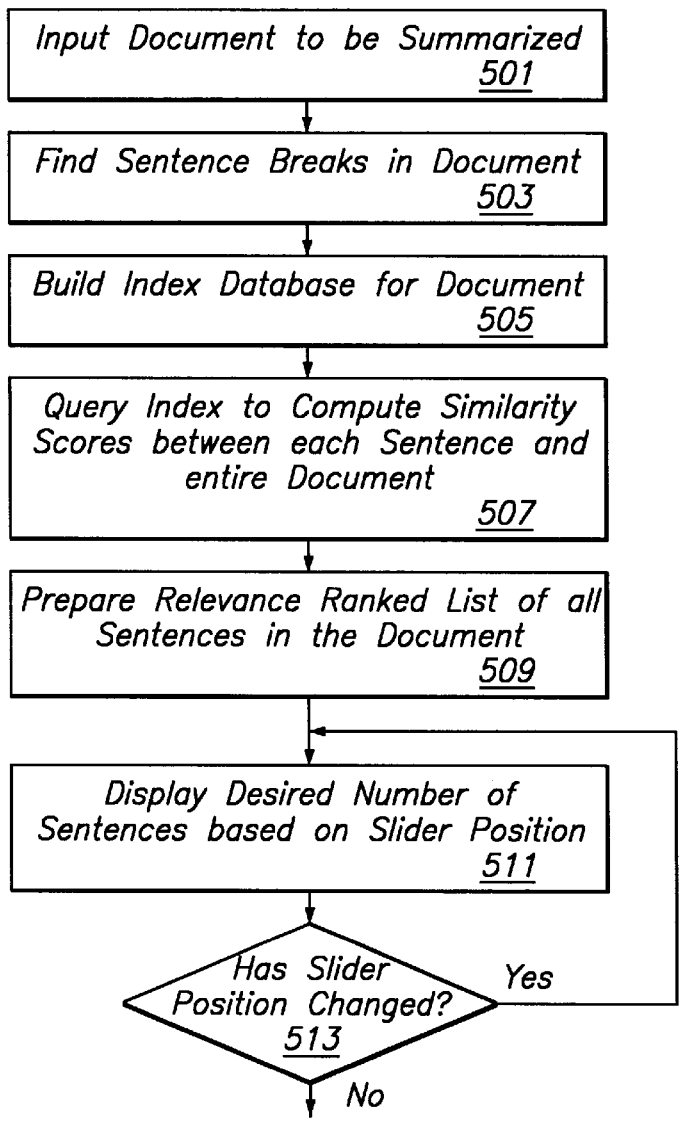
FIG. 5 is a flowchart of the document summarization methodology according to one implementation of the present invention.

Referring now to FIG. 5, the process of the present invention will now be described. When a document is to be summarized 501 with the present invention, it must first be determined 503 where the sentence breaks are in the document. Note that the sentence break determination approach of the preferred embodiment of the present invention is shown in the C++ programming language format in Appendix A to the present specification.

The next step is to determine the sentence ranking within the document being summarized. This is accomplished by first 505 building an index which is a database representing the contents of the sentences in the document in the form of statistics about the words in those sentences, a process which is well known in the art. Then, 507 the entire original document is treated as a query to the corpus of individual sentences in the document in accordance with the standard vector model approach. The result is a score indicating how well each sentence matches the query of the entire document and, hence, the output of the queries is a rank ordered list by score of all the sentences in the document 509.

Then, the desired number of sentences to include in the document summary display is determined 511, once a ranked list of each sentence in the original document is obtained, by examining either a preset value or the slider position value which thus indicates how far down the ranked list to go. Again, the markers on the slider could be represented as a proportional amount of the entire document, as a numeric value of the number of sentences of the total document, or even as a non-linear value indicator of the total document. While this last form may not sound as intuitive as the former ones, it is important to note that studies have shown that most of the content of a document can be understood by only reading a relatively small amount of the entire document (e.g., 20–25%). Further, remember that the user interface of the present invention frees the user to focus on the displayed summary content rather than on some more obscure summary percentage or value. As such, a non-linear slider may provide even greater utility to the user of the present invention.

Lastly, the slider position is monitored 513 so that if the user changes its position, thus indicating a desire for more or less information, the appropriate amount of summary information based on the new slider position 511 can be displayed.

It is important to note a performance advantage in the process just described. In the preferred embodiment of the present invention, because the query 507 asked for all of the sentences in the document before concerning itself with how many sentences will be displayed, every sentence in the document gets a ranking 509. Then, whenever the slider position is changed 513, displaying the larger or smaller summary is a relatively simple matter of merely displaying the more or less sentences as dictated by the previously generated relevance ranked list. In other words, by precomputing the relevance ranking, displaying more or less detail can be accomplished quickly without an additional query to be performed for each change in the slider position.

Further, in the preferred embodiment of the present invention, displaying more or less detail is done using an offscreen bitmap, a technique well known in the computer art. Using an offscreen bitmap makes the display appear to have the sentences instantly inserted or deleted in place rather than having the entire document summary appear to scroll from the top down whenever the user asks for more or less detail.

Note that the present invention has numerous applications. A more clear application would be as part of a document browser or within a document retrieval context thus allowing more rapid review of a corpus of documents. The present invention is equally useful within an electronic mail context where the user can view a summary of the electronic mail received and can then determine whether more or less of the contents of the entire electronic mail message(s) is desired.

Another useful application of the present invention is within the user interface of a modern computer system, such as the Apple Macintosh Finder, where stored documents (either locally stored, e.g., on a hard disk drive of the computer, or remotely stored, e.g., across a network or even across the internet) can be displayed by name, application type, date created, etc. When using such an interface, a user is oftentimes faced with a window displaying a long list of such stored documents without much hint as to what the documents actually contain. While documents or files are often given a particular name in order to provide a hint of their content or subject matter, the user is still often left wondering what a particular document or documents contain. As such, using the summarization engine of the present invention, the system could provide a "show top sentence" option. This option would display to the user the one sentence of a document which is most indicative of the contents of that document.

Figure 6:
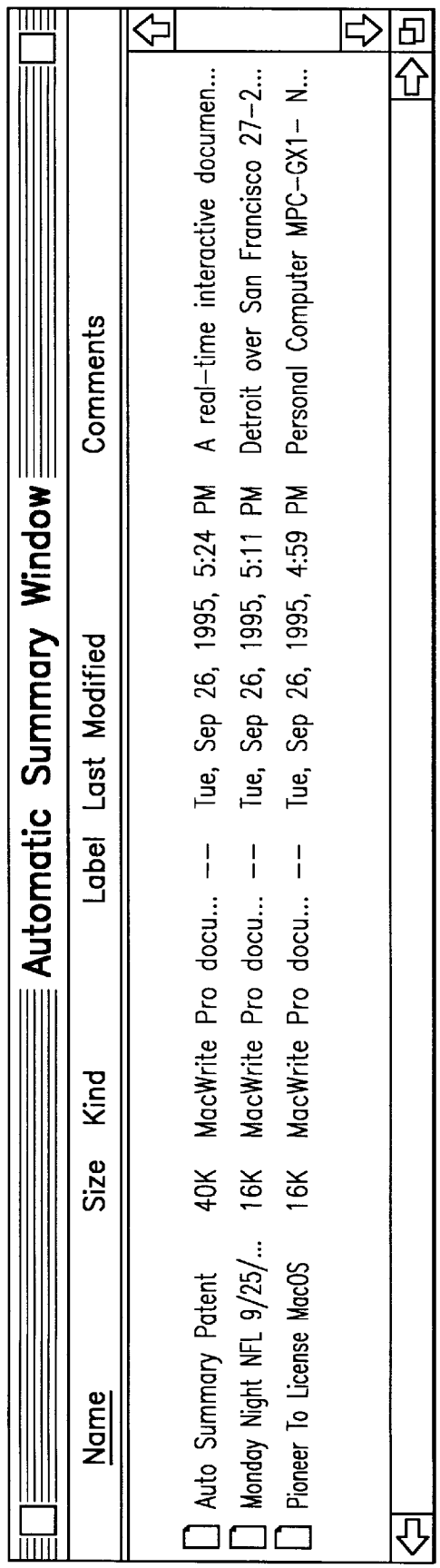
FIG. 6 is a sample user interface display showing some or all of the "top sentence" of each document in a display line or listing of documents in a computer system user interface.
Figure 7:
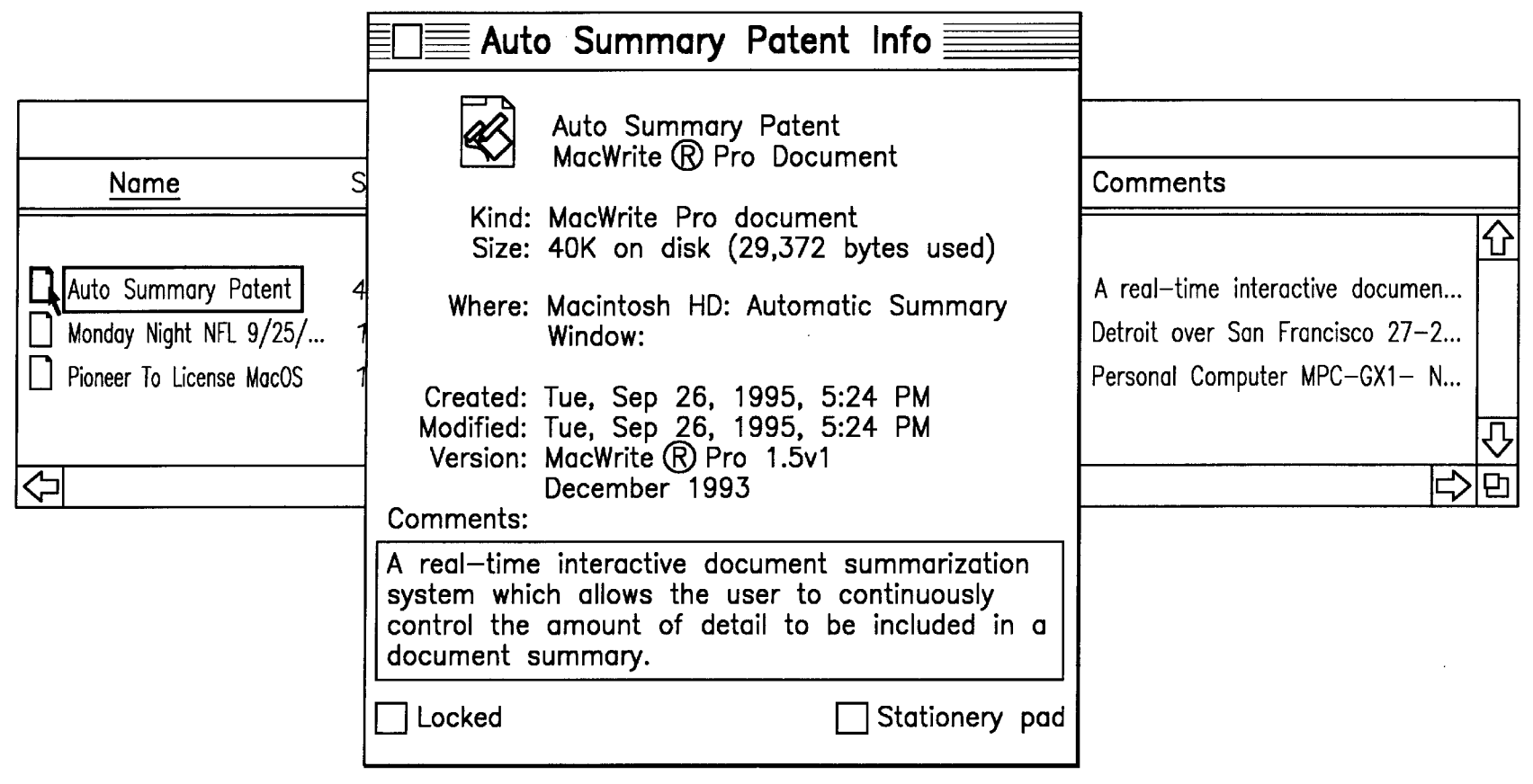
Figure 9:
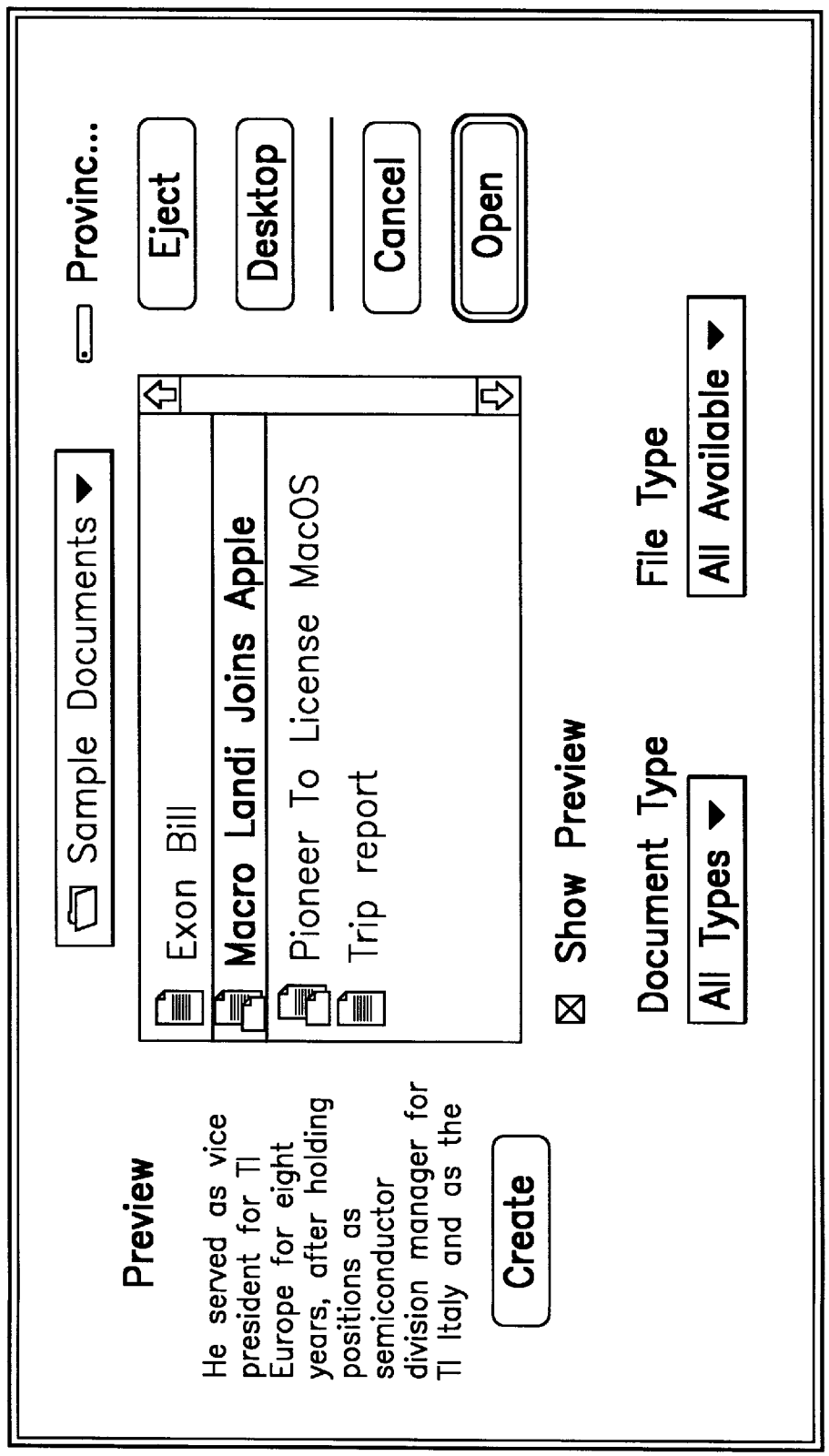

Such display could take the form of a portion of the display line or listing of documents in a computer system user interface as in a Finder folder window of the Macintosh computer system as is shown in FIG. 6 wherein the amount of the top sentence displayed is limited by the amount of window display space allotted to this field. Such display could also take the form of being displayed in a comments field of an informational window about the document in a computer system user interface as is shown in FIG. 7. Such display could also take the form of being an expanded display in a display line or listing of documents when the user positioned a pointer over the document name or icon, when in a particular expanded display mode, or when depressing a particular keyboard key and/or mouse button combination, as is shown in FIG. 8. Still further, such display could also take the form of an open dialog box where, instead of displaying a thumbnail miniature image of a graphic image document or merely the first sentence of a textual document, a summary comprised of a top sentence or sentences could be displayed, as is shown in FIG. 9.

An additional feature of the user interface document summary mechanism is the option, as in the more general document summary invention described above, for the user to control whether more or less of the document summary is to be displayed. In other words, while the default setting of a graphical user interface which displayed the "show top sentence" option might typically be to show only the one top sentence, the user could have the option of displaying a greater number of representative sentences from the summarized document. Such additional sentences might simply wrap onto the next line of the display or, instead, might only be displayed when the user positioned a pointer over the document name or icon when in a particular mode (e.g., similarly to the standard Macintosh Finder Balloon Help feature) or when depressing a particular keyboard key and/or mouse button combination. A large variety of display options is thus possible with the approach of the present invention depending upon such factors as display size and resolution, user preferences, and system capabilities.

In the foregoing specification, the present invention has been described with reference to a specific exemplary embodiment and alternative embodiments thereof. It will, however, be evident that various modifications and changes may be made thereto without departing from the broader spirit and scope of the invention as set forth in the appended claims. The specifications and drawings are, accordingly, to be regarded in an illustrative rather than a restrictive sense.

Appendix A

```
//-------------------------------------------------------------
//    find_next_sentence
//          On return, start_of_sent will be > buf if first chars encountered
//          are whitespace.
//
//          Normally returns length of sentence, starting from returned value
//              of start_of_sent
//          If it returns ( ), then it ran out of buffer before finding
//              a sentence. The caller will typically copy the remaining
//              text to the beginning of a buffer, fill up the buffer,
//              and then call this again. The case where a complete
//              sentence does not fit in the buffer should be checked
//              by the caller.
//          Can't handle "see J. P. there?" or "call A. Morgan's"
//          Handles Mr., Mrs., Ms., Dr., and i.e.
//-------------------------------------------------------------
int find_next_sentence(char* buf, uint32 length, char** start_of_sent,
                       bool *ran_out_of_buffer, bool *first_in_paragraph,
                       bool remove_returns)
{
    *first_in_paragraph = False;
        // chew up leading whitespace
    char* last_loc_of_buffer = buf + length - 1;
    // identify if this is the start of a paragraph
    bool last_was_return = False;
    while (isspace(*buf) && (buf<=last_loc_of_buffer))
    {
        switch (*buf)
        {
            case '\r':
            case '\n':       if(last_was_return)         // return followed by return
                                 *first_in_paragraph = True;
                             else
                                 last_was_return = True;
                             break;
            case '\t':       if (last_was_return)        // return followed by tab
                                 *first_in_paragraph = True;
                             else
                                 last_was_return = False;   // something came after the preceding
                                                            // return other than a return or tab
                                                            // break;
            case ' ':        if (last_was_return && isspace(*(buf+1)))   // return followed by
                                                                         // more than one
                                                                         // white space
                                 *first_in_paragraph = True;
                             else
                                 last_was_return = False;   // something came after the preceding
                                                            // return other than a return or tab
                             break;
            default: break;
        }
        ++buf;
    }
    *start_of_sent = buf;
    *ran_out_of_buffer = True;
    if(buf>last_loc_of_buffer)
    {
        *start_of_sent = 0;
        return 0;                       // note that past this point, we'll return *sum* length,
    }                                   // even if we hit end of the buffer before concluding a sent.
    // Now we start looking for the end of the sentence.
    *start_of_sent = buf;
    bool conclusive_sentence = False;
    bool abrev = False;
    char* lookahead;
    do // we're going to repeat a big loop until we find a sentence break or
```

-continued

Appendix A

```
// run out of characters in the buffer.
{
    switch(*buf) // Consider the current character in the buffer.
    {
        case '"': if(*(buf-1)=='.')              // handle {Suzanne said "I love you." }
                                                  // If it's a quotation mark preceded by a period,
                                                  // we found a sentence break.
                      conclusive_sentence = True;
                      break;
        case '.':     lookahead = buf+1;          // If it's a period, consider next character.
                      if(*lookahead == '.')       // handle elipses
                                                  // If part of an ellipsis (. . .), consider
                                                  // the character after the last period.
                      {
                          while( (*lookahead == '.') &&
                                  lookahead <= last_loc_of_buffer)
                              ++lookahead;
                      }
                      if(lookahead > last_loc_of_buffer) // no more characters
                      { buf = lookahead; break; )
                      // rule out some abbreviations by checking for
                      // space followed by capital letter
                      bool was_space_after_period = False;
                      while( isspace(*lookahead) &&      // skip white space
                                                         // Was there a space after the
                                                         // period? If so, it might be a
                                                         // sentence break.
                              lookahead <= last_loc_of_buffer)
                      {
                          ++lookahead;
                          was_space_after_period = True;
                      }
                      if(lookahead > last_loc_of_buffer)
                      { buf = lookahead; break; }
                      if (!was_space_after_period)
                          break;
                                          // things a sentence can start with here
                                          // If we have a quote, bullet, or dash after the
                                          // space, we'll treat this as a sentence break.
                      if( *lookahead == '"' || *lookahead == '•' || *lookahead == '-')
                          { conclusive_sentence = True; break; }
                      else if(!isupper(*lookahead))   break;
                                          // If lowercase letter after period, it's not a sentence break.
                      // otherwise, check if it was just an abbreviation
                      // now we check for 'Mr.', "Mrs." etc.
                      // currently handles (Dr. Mr. Mrs. Ms. i.e.)
                      if(buf - *start_of_sent >= 2)
                      {
                          switch(*(buf-1))
                          {
                              case 'r': if(*(buf-2) == 'M' || (*(buf2) == 'D')) // Dr. || Mr.
                                            abrev = True;
                                        break;
                              case 's': if (*(buf-2) == 'M')       // Ms.
                                            abrev = True;
                                        break;
                              case 'e': if (*(buf-2) == '.' && *(buf-3) == 'i')    // i.e.
                                            abrev = True;
                                        break;
                          }
                      }
                      if(buf - *start_of_sent >= 3        &&
                              *(buf-1) == 's'    &&
                              *(buf-2) == 'r'    &&
                              *(buf-3) == 'M')
                          abrev = True;
                      // special case: if a period is immediately followed by a double quote
                      // count the quote as part of the sentence.
                      //if(!abrev && *(buf+1)== '"')
                      //  ++buff;
                      conclusive_sentence = !abrev;      // if we get here its the
                                                         // simple case of end of
                                                         // sentence.
                      break;            // that is "hello there. Go away now."
    // catch & separate list itens here (expensive)
    // back to our initial character. If it wasn't a quote or period, what was it?
    case '\r'
    // This section is trying to separate lists of items (e.g., bullets) that may not
```

-continued

Appendix A

```
            // use punctuation to separate the items.
            case '\n' : if(remove_returns)
                            *buf = ' ';   // replace the return with a space
                        lookahead = buf+1;
                        while((*lookahead == ' ') &&        // skip space that might be
                                                            // between two returns
                                    lookahead <= last_loc_of_buffer)
                                ++lookahead;
                        if(lookahead > last_loc_of_buffer)
                        { buf = lookahead; break;
                        // detect list items (lacking sentence punctuation clues)
                        // If the newline followed by another, or a tab, or 3 or more
                        // spaces, it's a sentence break.
                        if(           *lookahead == '\n' || *lookahead == '\r' //two returns,
                            ||        *lookahead == '\t' //return followed by a tab
                                                            // --> paragraph delimiter
                            ||        (*lookahead == ' ' //return followed by 3 or more spaces
                                    && *(lookahead+1) == ' ' && *(lookahead+2) ==' '))
                        {
                            conclusive_sentence = True;
                            break;
                        }
                        while( isspace(*lookahead) &&       // skip white space
                                    lookahead <= last_loc_of_buffer)
                                ++lookahead;
                        if(lookahead > last_loc_of_buffer)
                        { buf = lookahead; break; }
                        // Ditto if followed by a bullet or two hpyhens.
                        if(*lookahead == '•' || (*lookahead == '-' && *(lookahead+1) == '-'))
                            { conclusive_sentence = True; break; }
                        break;
            // Back to (our initial character. If a question mark or exclamation point,
            // it's a break.
            case '?' :
            case '!' :          conclusive_sentence = True;
                        // if a period, '!', or '?' is immediately followed by a double quote
                        // count the quote as part of the sentence.
                        if(*(buf+1)== '"')
                            buf++;
                        break;
            default:    break;
        }
        buf++;
    }
    while (    !conclusive_sentence && (buf<=last_loc_of_buffer));
    *ran_out_of_buffer = !conclusive_sentence;
                // return the length you conclusive_sentence, even if we ran out of buffer
before
                // determining conclusively whether it's a sent or not.
                // ran_out_of_buffer gives that indicator.
    return      buf - *start_of_sent;
}
```

We claim:

1. An automatic method for presenting a document summary comprising the following steps;

a. presenting a number of segments of a relevance ranked list of segments of a document to a user on a display;

b. presenting a summary detail control on said display;

c. allowing a user to modify said summary detail control; and d. varying said number of said segments of said relevance ranked list of segments of said document presented to said user on said display according to said summary detail control.

2. The method of claim 1 further comprising the step of repeating steps c and d to provide continuous varying of said number of said segments presented to said user.

3. The method of claim 1 wherein said summary detail control comprises a first extreme and a second extreme.

4. The method of claim 1 wherein said segments comprise sentences.

5. The method of claim 1 wherein said summary detail control is linear.

6. The method of claim 1 wherein said summary detail control is non-linear.

7. The method of claim 1 wherein said summary detail control generates a specified relevance ranking and said step of varying said number of said segments of said relevance ranked list of segments of said document presented to said user on said display comprises displaying those segments with a relevance ranking having a predetermined relationship with said specified relevance ranking.

8. The method of claim 7 wherein said predetermined relationship includes greater than or equal to said specified relevance ranking.

9. The method of claim 3 wherein said first extreme comprises a first position causing all of said segments of said relevance ranked list of segments to be displayed on said display.

10. The method of claim 3 wherein said first extreme comprises a position causing all of said segments of said relevance ranked list of segments to be displayed on said display.

11. The method of claim 3 wherein said second extreme comprises a second position causing one of said segments of said relevance ranked list of segments to be displayed on said display.

12. The method of claim 10 wherein said one of said segments is a most relevant segment of said document.

13. An apparatus for presenting a document summary comprising:

a. A display for presenting a number of segments of a relevance ranked list of segments of a document to a user on said display;

b. a summary detail control;

c. a modifier for allowing a user to modify said summary detail control; and d. an updater for varying said number of said segments of said relevance ranked list of segments of said document presented to said user on said display according to said summary detail control.

14. The apparatus of claim 13 further comprising an activator which activates said modifier and said updater continuously to provide continuous varying of said number of said segments presented to said user.

15. The apparatus of claim 13 wherein said summary detail control comprises a first extreme and a second extreme.

16. The apparatus of claim 13 wherein said segments comprise sentences.

17. The apparatus of claim 13 wherein said summary detail control is linear.

18. The apparatus of claim 13 wherein said summary detail control is non-linear.

19. The apparatus of claim 13 wherein said summary detail control includes a means for generating a specified relevance ranking and said updater comprises a means for displaying those segments with a relevance ranking having a predetermined relationship with said specified relevance ranking.

20. The apparatus of claim 19 wherein said predetermined relationship includes greater than or equal to said specified relevance ranking.

21. The apparatus of claim 15 wherein said first extreme comprises a first position causing all of said segments of said relevance ranked list of segments to be displayed on said display.

22. The apparatus of claim 15 wherein said first extreme comprises a position causing all of said segments of said relevance ranked list of segments to be displayed on said display.

23. The apparatus of claim 15 wherein said second extreme comprises a second position causing one of said segments of said relevance ranked list of segments to be displayed on said display.

24. The apparatus of claim 22 wherein said one of said segments is a most relevant segment of said document.

25. A computer system medium containing a series of instructions configured to cause a computer system to perform steps of the following method comprising:

a. presenting a number of segments of a relevance ranked list of segments of a document to a user on said display;

b. presenting a summary detail control on a display;

c. allowing a user to mode said summary detail control; and d. varying said number of said segments of said relevance ranked list of segments of said document presented to said user on said display according to said summary detail control.

26. The computer system medium of claim 25 further comprising instructions to cause the step of repeating steps c and d to provide continuous varying of said number of said segments presented to said user.

27. The computer system medium of claim 25 wherein said summary detail control comprises a first extreme and a second extreme.

28. The computer system medium of claim 25 wherein said segments comprise sentences.

29. The computer system medium of claim 25 wherein said summary detail control is linear.

30. The computer system medium of claim 25 wherein said summary detail control is non-linear.

31. The computer system medium of claim 25 wherein said summary detail control generates a specified relevance ranking and said step of varying said number of said segments of said relevance ranked list of segments of said document presented to said user on said display comprises displaying those segments with a relevance ranking having a predetermined relationship with said specified relevance ranking.

32. The computer system medium of claim 31 wherein said predetermined relationship includes greater than or equal to said specified relevance ranking.

33. The computer system medium of claim 27 wherein said first extreme comprises a first position causing all of said segments of said relevance ranked list of segments to be displayed on said display.

34. The computer system medium of claim 27 wherein said first extreme comprises a position causing all of said segments of said relevance ranked list of segments to be displayed on said display.

35. The computer system medium of claim 27 wherein said second extreme comprises a second position causing one of said segments of said relevance ranked list of segments to be displayed on said display.

36. The computer system medium of claim 35 wherein said one of said segments is a most relevant segment of said document.

* * * * *

UNITED STATES PATENT AND TRADEMARK OFFICE
CERTIFICATE OF CORRECTION

PATENT NO. : 5,838,323
DATED : November 17, 1998
INVENTOR(S) : Rose, et al.

It is certified that error appears in the above-identified patent and that said Letters Patent is hereby corrected as shown below:

In the claims:

Claim 25, column 16, line 10, delete "mode" and insert --modify--.

Claim 12, column 15, line 9, delete "10" and insert --11--.

Claim 24, column 16, line 1, delete "22" and insert --23--.

Signed and Sealed this

Third Day of August, 1999

*Attest:*

Q. TODD DICKINSON

*Attesting Officer*   Acting Commissioner of Patents and Trademarks